United States Patent [19]

Ninneman

[11] 4,201,535
[45] May 6, 1980

[54] APPARATUS FOR FORMING TUBULAR PLASTIC ARTICLES

[75] Inventor: Lawrence D. Ninneman, Toledo, Ohio

[73] Assignee: Owens-Illinois, Inc., Toledo, Ohio

[21] Appl. No.: 923,134

[22] Filed: Jul. 10, 1978

Related U.S. Application Data

[63] Continuation-in-part of Ser. No. 738,508, Nov. 3, 1976, Pat. No. 4,136,146.

[51] Int. Cl.² .................. B29C 7/00; B29D 23/02
[52] U.S. Cl. ..................... 425/548; 264/328; 264/336; 425/537; 425/547; 425/556; 425/577; 425/588; 425/438
[58] Field of Search ............. 264/328, 329, 334, 336, 264/297, 237, 348, 535, 538; 425/438, 533, 537, 547, 548, 556, 577, 588, 526

[56] References Cited

U.S. PATENT DOCUMENTS

| | | | |
|---|---|---|---|
| 2,853,736 | 9/1958 | Gussoni | 264/538 X |
| 2,974,362 | 3/1961 | Knowles | 425/537 X |
| 3,655,317 | 4/1972 | Funkhouser et al. | 264/334 X |
| 3,707,591 | 12/1972 | Chalfant | 264/538 X |
| 3,784,348 | 1/1974 | Aoki | 264/538 X |
| 3,837,776 | 9/1974 | Farrell | 425/526 |
| 3,853,451 | 12/1974 | Bendzick | 425/438 |
| 3,944,645 | 3/1976 | Farrell | 264/314 X |
| 4,126,291 | 11/1978 | Gilbert et al. | 425/556 X |

FOREIGN PATENT DOCUMENTS

221250  7/1968  U.S.S.R. .................. 264/334

*Primary Examiner*—Jan H. Silbaugh
*Attorney, Agent, or Firm*—Richard D. Heberling

[57] ABSTRACT

A method and apparatus are disclosed for injection molding tubular plastic articles around cylindrical core pins at a molding station, for cooling the articles while supported on the core pins, and for then axially stripping the articles from the core pins at an ejection station. The article stripping step is accomplished by a horizontally reciprocable carriage which is selectively moved into and out of vertical alignment with a set of core pins and molded articles positioned at the ejection station. Sectional gripping members on the carriage are radially closable when in alignment with the molded articles, to grasp the articles for their axial removal from the core pins upon the horizontal displacement of the carriage. The stripped articles may be held in a horizontal cantilever position between the gripping members during an operational dwell time for additional cooling subsequent to their removal from the core pins.

7 Claims, 9 Drawing Figures

APPARATUS FOR FORMING TUBULAR PLASTIC ARTICLES

RELATED APPLICATION

This application is a continuation-in-part of my copending application Ser. No. 738,508 filed Nov. 3, 1976 now U.S. Pat. No. 4,136,146.

BACKGROUND OF THE INVENTION

This invention relates generally to the field of injection molding plastic articles, such as blowable plastic parisons, around a set of cylindrical core pins, cooling the articles while on the core pins, and then stripping the molded articles from the core pins for subsequent processing.

The art of forming bottles and containers by blow molding has advanced to the stage where several thousands of such articles can be formed each hour. This necessarily requires that the blowable parisons from which the articles are blown be formed rapidly and inexpensively, either by extrusion or injection molding techniques. In injection molding processes, it therefore becomes important to reduce the overall cycle time and to reduce the tooling expenses. Additionally, it is desirable in many situations that the parisons have a thickness profile to optimize material usage.

The prior injection molding machines have not provided these overall desirable features. For example, one prior art injection molding technique utilizes horizontally reciprocable molds including core pins which are telescopically inserted into an elongated horizontal mold cavity. This arrangement exhibits several shortcomings, including: first, difficulty in molding tapered parisons with controlled varying thicknesses; second, relatively high cycle times; and third, expensive tooling, for example, because cam-operated mold sections are needed to form the threaded finish.

A further difficulty has been encountered in high speed operation of such machines, namely, that stripping of the injection molded parisons from the supporting core pins has very often resulted in damage to the neck finish portion of such parison. This is believed due to the fact that most stripping operations have applied the stripping forces to the threads and/or a relatively wide flange that commonly appears at the bottom portion of a bottle neck so that the force exerted on the extreme end portions of the parison neck are primarily tensile and, as is well known, heated thermoplastic material is very weak in tension and readily subject to cracking.

SUMMARY OF THE INVENTION

The present invention overcomes these prior shortcomings and problems through an injection molding system which, in the total disclosed combination, includes a turret rotationally mounted about a vertical axis and having a plurality of horizontal sets of core pins radially extending outwardly from the turret. Several separate stations may be located along an arcuate path adjacent the turret, including particularly an injection molding station a cooling and parison ejection station.

A pair of horizontally positioned mold sections are provided at the injection molding station and are relatively movable in the vertical direction to selectively close around the sets of core pins to form tubular injection molding cavities.

At the ejection station, a horizontally movable carriage is utilized to strip the molded articles from the core pins after they are swung into position by the turret. The horizontally movable carriage includes a plurality of semicylindrical sets of gripping surfaces which are formed on radially displaceable ejection blocks to selectively engage and disengage outer peripheral sections of the molded articles. The carriage itself is reciprocable between two primary positions. In the first of these positions, each set of gripping surfaces is radially aligned with a portion of a respective core pin at the ejection station; in the second of the positions, the gripping surfaces are horizontally displaced from the core pins. Displacement means are carried by the carriage for selectively closing the gripping sections around the molded articles at the first of the primary positions and for selectively opening the gripping sections at the second of the primary locations, to disengage the plastic article for ejection.

In accordance with a preferred modification of this invention, the annular end face of the neck portion of the injection molded parison is defined by an internally projecting annular shoulder provided in the parison mold cavity. The stripping members are then provided with internally projecting shoulders which abut the aforementioned annular end face on the parison neck and effect the stripping of the parison from the core through the application of compressive forces to the neck portion of the parison.

In an optional operation, the displacement means is operable to open the gripping surfaces after the carriage has remained at the second primary location for a dwell period, during which time the parisons are held in a horizontal cantilever position for additional cooling.

In another optional operation, the core pins may be indexed to a cooling station between the injection molding station and the cooling and ejection station. This optional station may include a cool air source directing a stream of cooling fluid onto the exterior surfaces of the thermoplastic articles to facilitate increased production rates.

In one of its broader aspects, the method includes axially aligning a molded article, such as a blowable tubular parison supported on a cantilevered, cylindrical mold surface, with a pair of radially spaced gripping surfaces which are laterally spaced from the cantilevered end of the mold surface and molded article. Then, the gripping surfaces are displaced in an essentially single, uninterrupted motion toward the supported end of the mold surface to a position in radial alignment with a portion of the molded article. Thereafter, the gripping surfaces are radially displaced toward the axis of the cylindrical mold surface to engage and grip a peripheral portion of the molded article. Finally, the gripping surfaces are laterally displaced in unison coaxially of the cylindrical mold surface away from the supported mold end to strip the molded article from the mold surface.

As mentioned above, in a preferred embodiment, the neck portion of the parison is formed in the parison mold in such manner that when a parison mold is opened, at least the outer radial portion of the annular end face of the parison neck projects radially beyond the core surface and the gripping surfaces are provided with a co-operating annular surface which abuts the aforementioned projecting annular portion of the neck end face so that the parison is stripped from the core while a compressive force is applied to the end of the parison neck.

Again, an optional method step includes holding the molded article between the gripping surfaces in an essentially cantilevered position after the stripping step to continue cooling the article, and then radially displacing the gripping surfaces away from each other to disengage the article.

Accordingly, the present invention provides numerous advantages not found in the prior art. First, the invention utilizes a vertically movable injection mold which is partable along the axis of the mold cavities, permitting easy contouring of the parison outer diameter to reduce tooling and costs, in addition to permitting optimized material distribution. Second, the overall cycle is designed to maintain an injected parison on a cooled core pin as long as practical, in order to cool the parison to a non-deformable temperature. Third, an ejection system is provided to remove the molded articles from the core pins, and to optionally hold the molded articles in a cantilevered position during a portion of the overall operational cycle for further cooling. Further, the overall system enables the rapid production of cooled tubular parisons for later use in high production blow molding operations.

Lastly, the parisons are efficiently stripped from the supporting cores at high speed and without incurring any tearing of the neck portion of the parison which has been encountered in machines not operated in accordance with the method of this invention nor equipped with the parison stripping apparatus embodying this invention.

Other advantages and meritorous features of this invention will be more fully appreciated from the following detailed description and the appended claims.

BRIEF DESCRIPTION OF THE DRAWINGS

FIGS. 8 and 9 illustrate a preferred modification of a core pin, parison mold and gripping mechanism which facilitates stripping of the parison from the core pin.

BRIEF DESCRIPTION OF THE PREFERRED EMBODIMENTS

The Embodiment of FIGS. 1-5

Figure 1:
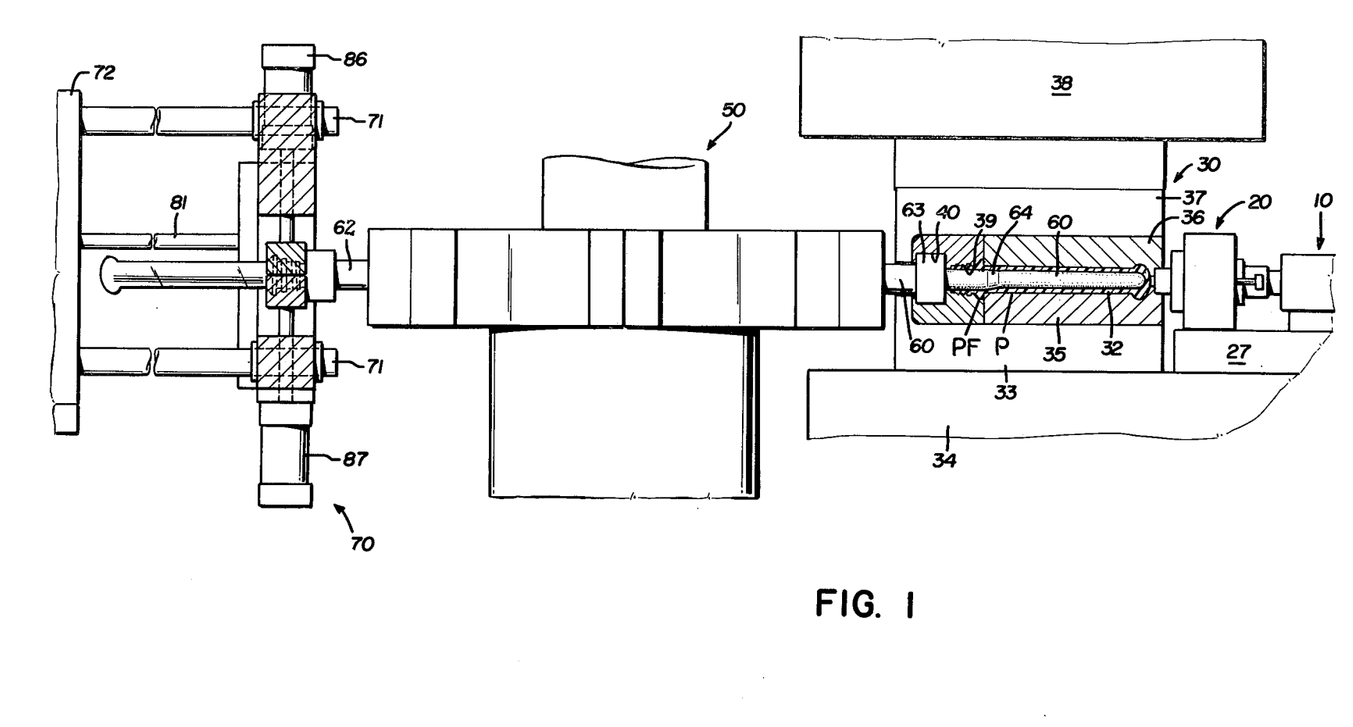
FIG. 1 is a side elevational view of the overall injection molding and ejection system, with partial cross-sectional illustrations for detail.

Referring more particularly to the drawings, FIG. 1 illustrates the overall molding and ejection system, including an injection machine 10, which supplies plasticized, flowable plastic material to an injection mold 30 by way of a runner housing 20. A rotatable and vertically movable turret 50 is interposed between the molding station 30 and a cooling and ejection station 70, and includes two sets of diametrically opposed and radially extending identical core pins 60 and 62, which are respectively positioned at the molding and ejection stations.

The plasticizer 10 may be of conventional design, such as a plunger-type or reciprocable screw-type machine, and includes a nozzle 12 which mates with an injection fitting 22 on the runner housing 20. A main runner line 23 extends transversely along the length of the runner housing 20 to supply flowable plastic material to a plurality of branch runner lines 24 formed by sprue bushings 25. An injection port 31 at the end of each injection mold cavity is axially aligned with the sprue bushings 25 to selectively receive plastic material for forming the tubular plastic articles. The selective opening and closing of the branch runner lines 24 is effected by a plurality of pin valves 26, which are commonly moved by conventional means (not shown), such as a hydraulic cylinder and piston and a common displacement plate. As shown in FIG. 1, the runner housing 20 is supported on a base plate 27 of a support 34. Additionally, the runner housing may include conventional heating cartridges (not shown) to maintain the plastic material in a heated flowable condition.

Figure 3:
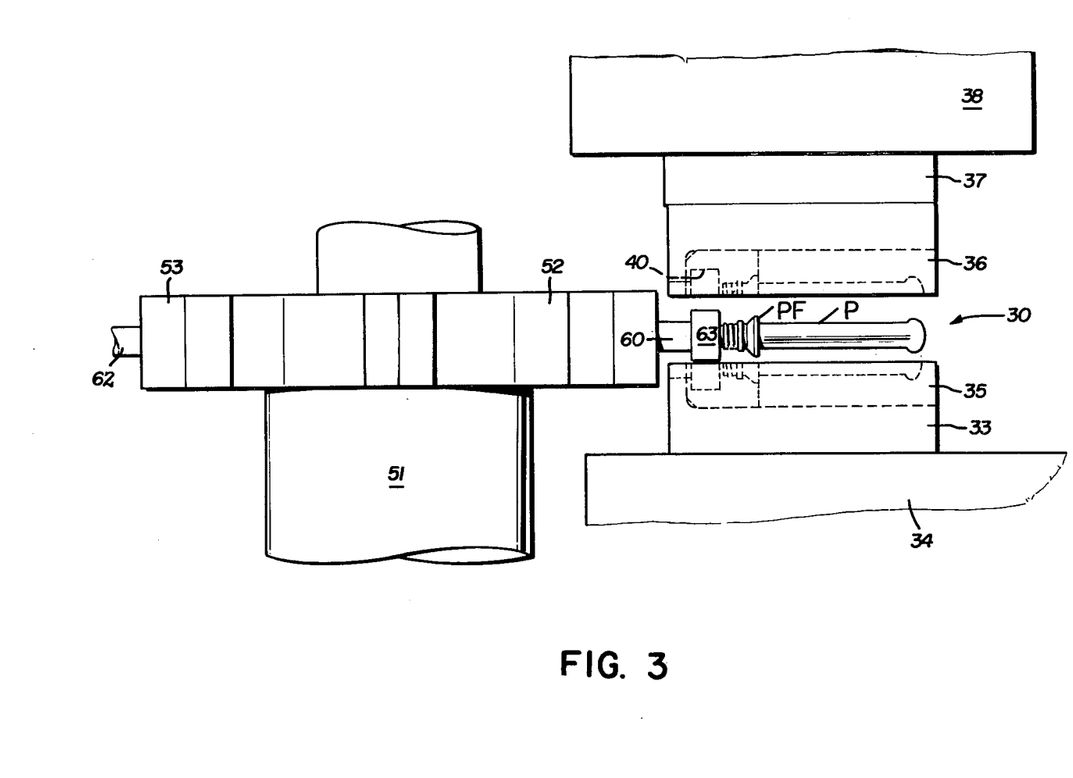
FIG. 3 is a side elevational view, illustrating the removal of the injection molded parisons from the mold cavities.

The injection molds include a lower fixed mold half 35 suitably secured to a fixed lower cavity retainer block 33 which is supported on the base 34. An upper mold half 36 is likewise suitably secured to an upper cavity retainer block 37 on upper press platen 38 that is vertically movable by suitable conventional power means (not shown). The upper and lower mold sections 35 and 36 have semi-cylindrical cavities and semi-cylindrical ports that collectively form the mold cavities 32 and the injection portions 31. Optionally, the mold halves may include finish and neck support contours 39. As shown in FIGS. 1 and 3, the mold halves may also include semi-cylindrical recesses 40 for receiving a sleeve or enlarged boss 63 on each of the core pins for the purpose of aligning the core pins within the mold cavities.

The rotatable turret 50 includes a vertically movable and rotatable support column 51 which is raised and lowered by conventional hydraulic power means (not shown) and which is rotated by conventional means (not shown), such as a rack and pinion. A pair of mounting blocks 52 and 53 are suitable secured to the rotatable turret and each carry a set of diametrically opposed cantilevered core pins 60 and 62, which extend generally radially away from the mounting blocks for selective placement at either the molding station 30 or the cooling and ejection station 70. The disclosed turret arrangement includes four illustrated core pins in each set, but this number may be varied as desired.

Figure 2:
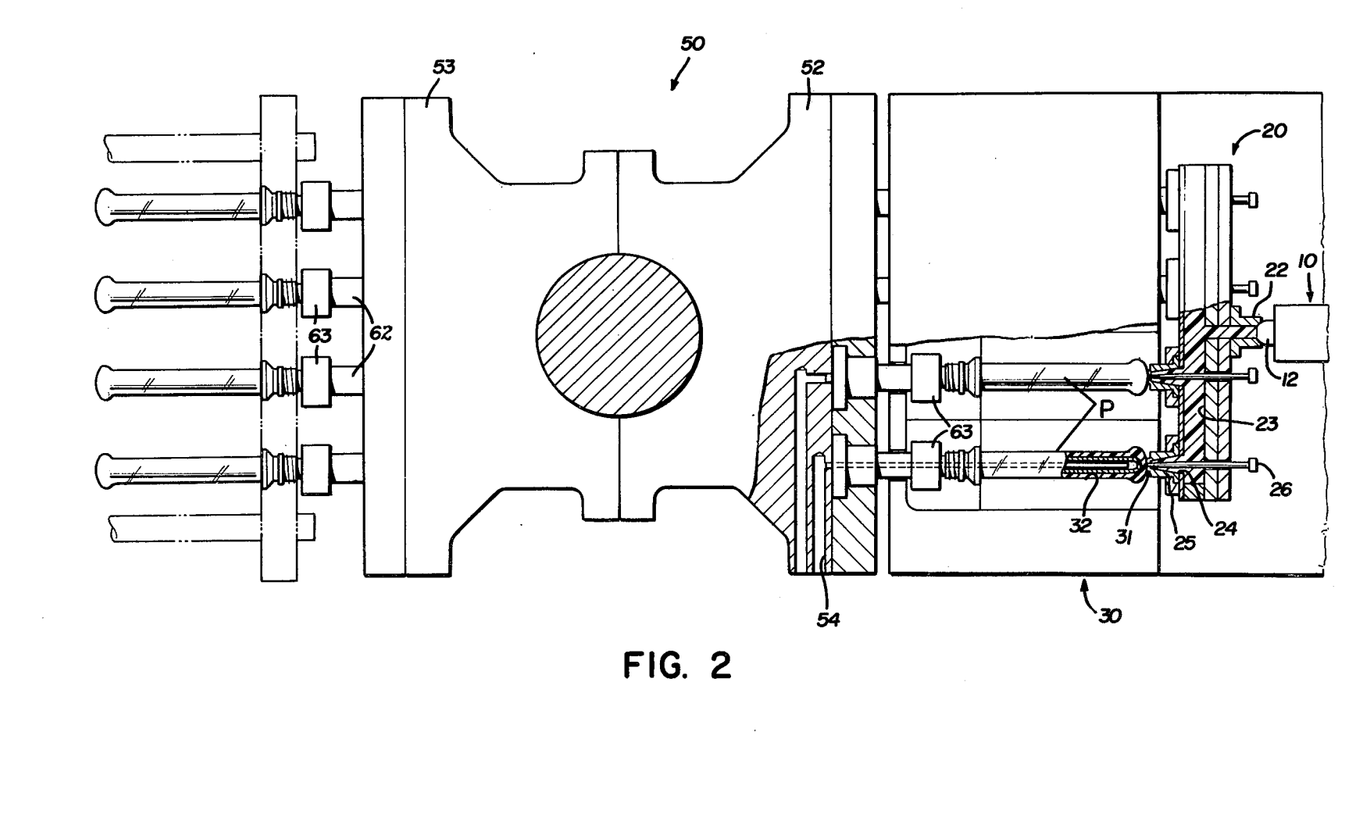
FIG. 2 is a top plan view similar to FIG. 1, with partial cross-sections illustrating the details of the injection molding station.

As shown in FIG. 2, somewhat conventional fluid delivery ducts 54 are formed in the turret mounting blocks to supply cooling fluid to the interior of the hollow core pins to cool the plastic material as soon as it is injected into the mold cavity and then thereafter when the molded article is conveyed by the core pins to the ejection station. Further, FIG. 1 illustrates that the core pins may include a varying contour, as shown by frusto-conical tapering region 64 adjacent the finish and neck support region, for the purpose of varying the wall thickness of the molded parisons. Similarly the mold halves may be contoured to provide a desired wall thickness distribution, since the molds are partible along the axis of the core pins.

FIG. 3 illustrates that the mold sections part along the axis of the core pins to facilitate the stripping of the molded articles from the molding cavities. Opening of the molds may be effected in a variety of ways, but the preferred embodiment includes first raising the upper mold 36 to the position illustrated in FIG. 3. This enables the upper half of the molded articles to be initially stripped from only half the mold cavity surface. Thereafter, the turret is raised to the position shown in FIG. 3, stripping the lower half of the molded articles from the other half of the mold cavity surfaces and thereby exposing the articles to ambient air for an additional cooling effect. With the turret thus positioned, clearance is provided to rotate the turret about its vertical axis for swinging the set of core pins 60 from the molding station along an arcuate path to the ejection station 70.

Figure 4:
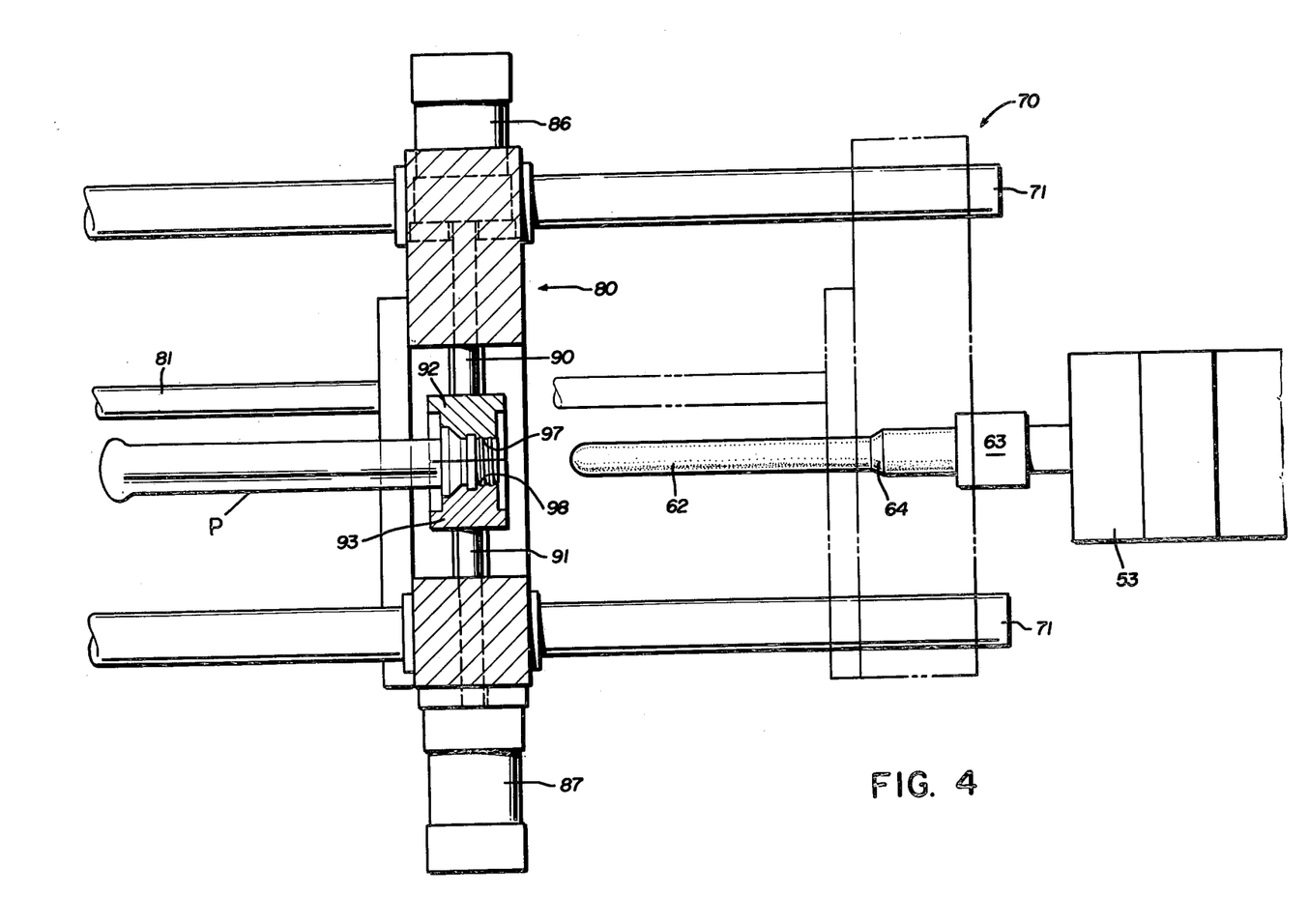
FIG. 4 is a side elevational detail of the ejection station and the horizontally reciprocable stripping carriage, taken along plane 4—4 in FIG. 5.
Figure 5:
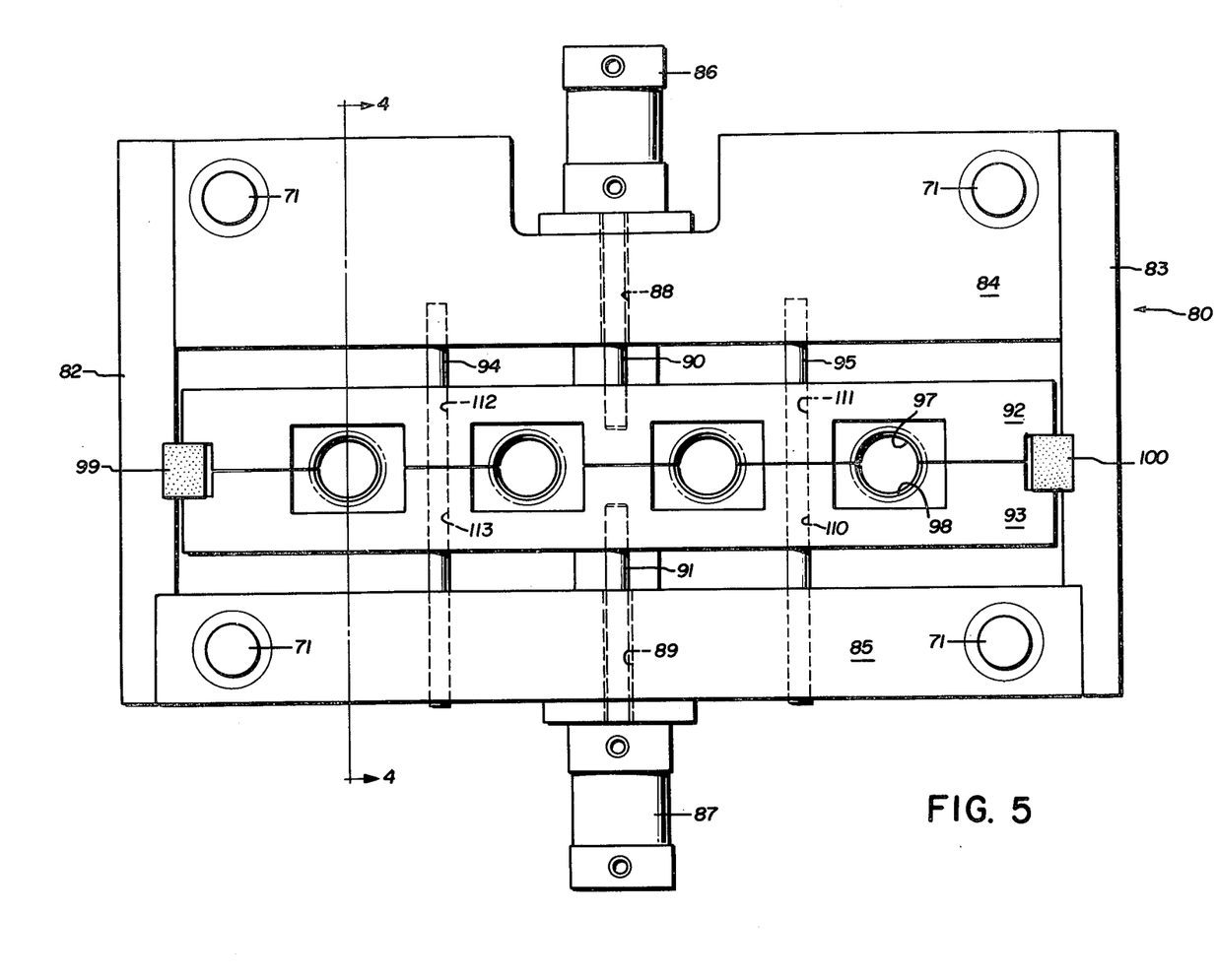
FIG. 5 is a frontal elevational view of the ejection system.

Turning now to the ejection station 70, illustrated in FIGS. 1, 4, and 5, four cantilever tie rods 71 extend from a support structure 72 to receive the cantilever core pins, as best shown in FIG. 4. A reciprocable ejection carriage 80 carried by the tie rods 71 is moved horizontally by a push rod 81 interconnected with suitable power means (not shown).

The horizontally movable carriage 80 includes two laterally disposed frame members 82 and 83 and two interconnected upper and lower horizontal frame members 84 and 85, each having suitable openings to receive the four tie rods 71. Two vertically aligned hydraulic cylinders 86 and 87 are respectively secured to the upper and lower frame members 84 and 85, which include vertical bores 88 and 89, respectively, to receive piston rods 90 and 91 associated with each of the hydraulic cylinders. The ends of the piston rods are rigidly secured to respective horizontal ejection blocks 92 and 93, having bores 110, 111, 112, and 113 to receive vertical guide rods 94 and 95. As best shown in FIG. 4, the ejection blocks 92 and 93 have several sets of semi-cylindrical gripping surfaces 97 and 98 corresponding in contour to the finish and neck support ledge on the molded article.

When the ejection blocks 92 and 93 are moved toward each other, i.e. in a radially inward direction relative to the axis of the core pins, to the illustrated position in abutment with blocks 99 and 100, the gripping surfaces 97 and 98 engage and grasp the finish and neck support region of the molded articles. Then, as the carriage 80 is moved from the position shown in phantom lines in FIG. 4 to the full line position of FIG. 4, the molded plastic parisons are stripped from the core pins. The ejection blocks 92 and 93 may then be immediately retracted by the hydraulic cylinders 86 and 87 to disengage the parisons to permit them to fall onto a conveyor or into a hopper for further processing. Alternatively, the ejection blocks may remain closed while the turret 50 is rotated to position the other set of core pins at the ejection station with freshly molded articles, during which time the stripped parisons are held in a horizontal cantilevered position to continue cooling, as illustrated in FIG. 4. During this time, optional cooling air currents may be directed onto the parisons. After rotation of the turret to position another set of core pins at the ejection station and after the release of the parisons from the ejection blocks, the carriage 80 is horizontally displaced back to the phantom-line position shown in FIG. 4 to strip the next set of parisons from the core pins. Normally, the parisons will be stripped from the core pins just prior to indexing the turret, in order to maintain the parisons on the cooled core pins as long as practical during the overall cycle.

In the overall operation, one of the sets of core pins is enclosed within the mold cavities 32 to receive flowable plastic material from the injection molding machine 10 and the runner housing 20. At the same time, the second set of core pins is positioned at the cooling and ejection station 70 between the cantilever tie rods 71. During the injection molding step, the horizontally displacable carriage 80 is moved from the position shown in FIG. 4 to a position where the gripping surfaces are in alignment with the finish and neck support region of the parison. Naturally, the ejection blocks 92 and 93 are in a retracted position during the horizontal carriage movement toward the turret. After the carriage 80 has been moved into proper alignment with the molded article, the ejection blocks 92 and 93 are moved toward each other by respective piston rods 90 and 91 of hydraulic cylinders 86 and 87 to place gripping surfaces 97 and 98 into engagement with the appropriate portion of the molded parisons. Immediately thereafter, the carriage 80 is reciprocated back to the position shown in FIG. 4 to strip the parisons from the core pins. A discussed previously, the ejection blocks may be opened promptly to drop the molded parisons; alternately, the ejection blocks may remain closed for a dwell period to hold the parisons in a horizontal cantilever position for continued cooling as the turret is raised and rotated.

After one set of parisons has been injected onto one set of the core pins and the previously molded set of parisons has been stripped from the other set of core pins, the molds are opened, as shown in FIG. 3, so that the turret may be rotated to repeat the cycle sequentially.

Figure 6:
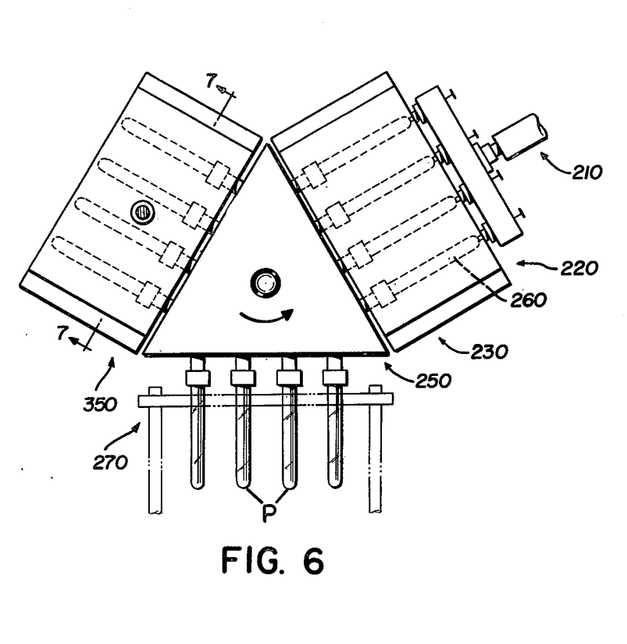
FIGS. 6 and 7 relate to a second embodiment, which includes an optional cooling station between the injection molding and ejection stations.
Figure 7:
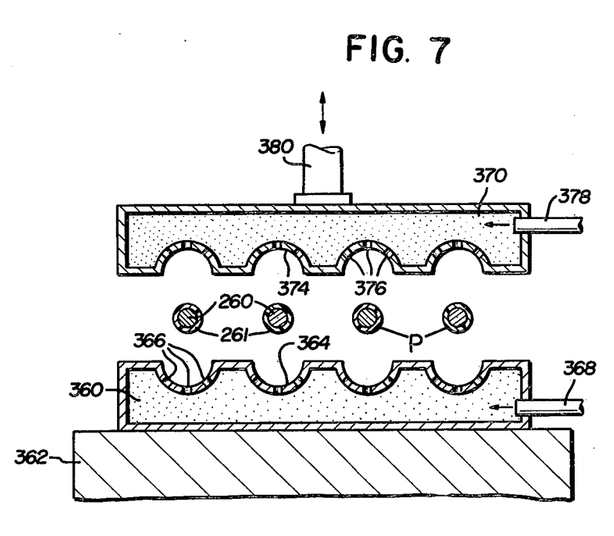

The Embodiment of FIGS. 6 and 7

FIG. 6 illustrates a second embodiment identical in every respect to the previously disclosed embodiment, with the exception that an additional cooling station 350 is interposed between the injection molding station 230 and the ejection and cooling station 270. Accordingly, the vertically raisable and rotationally mounted turret 250 includes three sets of core pins 260 which are sequentially positioned at the three processing stations. Apparatus components in this embodiment which are identical to corresponding components in the embodiment of FIGS. 1–5 are represented by reference numerals which are greater by 200 than the corresponding reference numerals in the prior embodiment. For example, the plasticizer is indicated by reference numeral 210, the runner housing by reference numerals 220, and the ejection mechanism by reference numeral 270.

Referring more particularly to FIG. 7, the cooling station 350 is shown as including a lower plenum housing 360 which is supported on a base 362. The housing includes elongated semi-cylindrical surfaces 364 having ports 366 for directing streams of air onto the outer surfaces of the plastic parisons 261. Air is supplied to the interior of the lower plenum 360 by a supply passageway 368 that is connected with a suitable source of air under pressure.

An upper, vertically movable plenum housing 370 is substantially identical to the lower plenum housing 360 and includes a plurality of arcuate, semi-cylindrical surfaces 374 which have passageways 376 to also direct streams of air from the interior of the upper plenum housing 370 onto the external surfaces of parisons 261. Likewise, air under pressure is supplied to the interior of plenum housing 370 by a fluid passageway 378.

In operation, parisons are injected onto a set of core pins 260 at the injection molding station 230, while the sections of the molds are closed around the core pins. Thereafter, the upper press platen associated with the injection mold is raised and turret 250 is raised to an intermediate position between the upper and lower mold halves. Next, the turret 250 is rotated in a counter clockwise manner to position the freshly injection molded parisons 261 on the core pins 260 between the upper and lower plenum housings 370 and 360, respectively. During the indexing phase of the operation, the upper plenum housing 370 will be raised by a rod 380 to a position above that shown in FIG. 7; additionally, the core pins and plastic parisons will be above the position shown in FIG. 7.

After completion of the rotational indexing movement, turret 250 is lowered to position the core pins 260 and injection molded parisons 261 in the position shown in FIG. 7. After lowering the turret 250, or simultaneously with the lowering movement of the turret, the upper plenum housing 370 is downwardly displaced by rod 380 which is interconnected with a conventional power source, such as a hydraulic ram (not shown), to the position in FIG. 7. While the parisons are positioned at this location, streams of cooling air are directed through air delivery ports 366 and 376 onto the parison exterior surfaces for cooling. As discussed in connection with the prior embodiment, the parisons are simultaneously cooled on their interior by cooling fluid which is circulated through the interior of the core pins 260.

Next, the upper plenum housing 370 is raised, the turret is raised, and then the turret is indexed in a counterclockwise direction to displace the parisons from station 350 at station 270 for further cooling and ejection. The operation at station 270 is the same as that disclosed in connection with the operation at station 70 in the embodiment shown in FIGS. 1-5.

Figure 8:
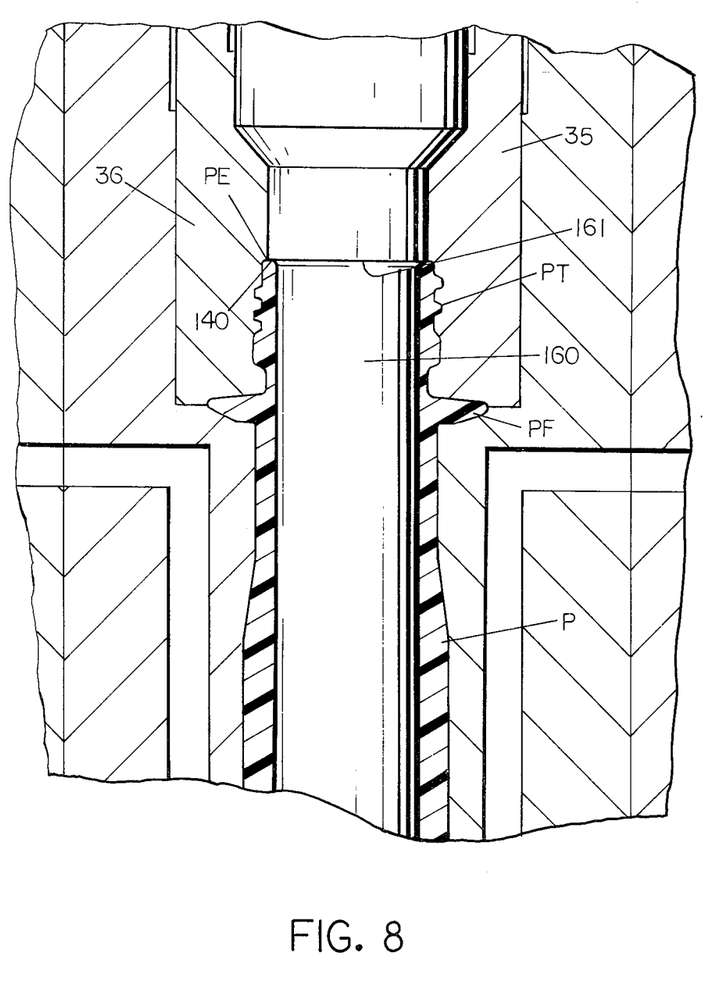
FIG. 8 is an enlarged scale sectional view of the neck portions of an individual injection mold closed around a core pin and shows the molding cavity filled with plastic to produce a parison.
Figure 9:
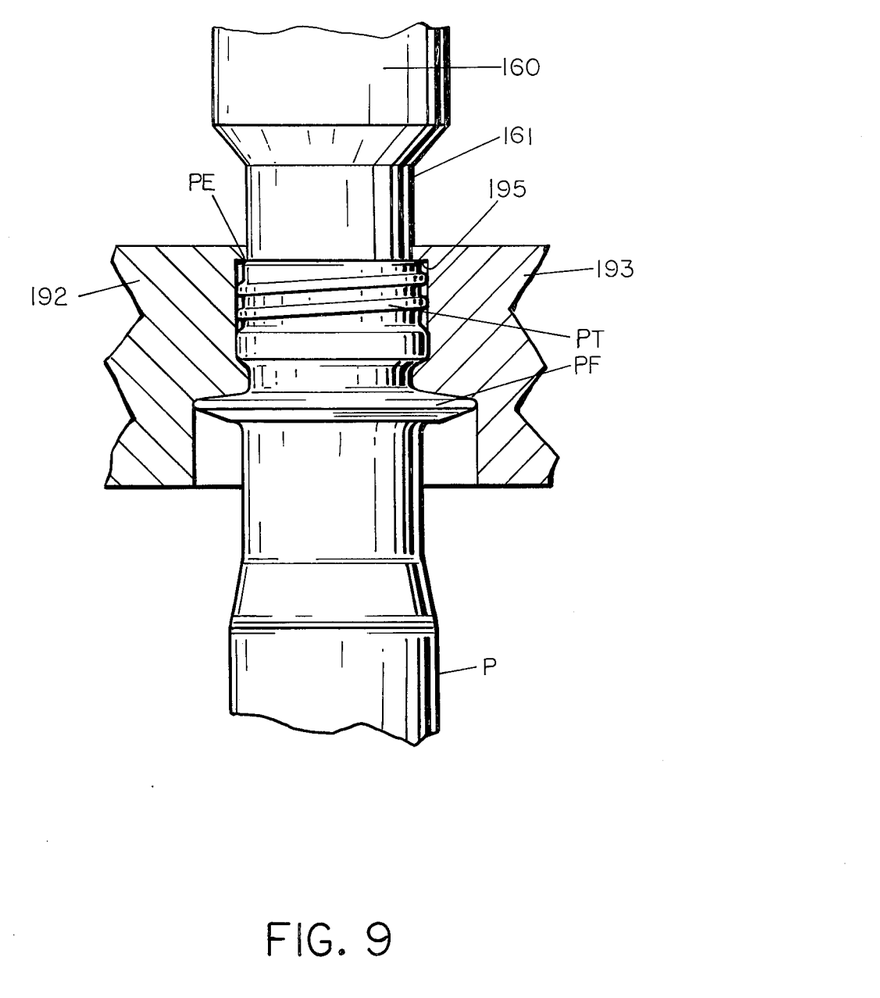
FIG. 9 is an enlarged scale, sectional view of the modified gripping mechanism for stripping the parison from the core pin of FIG. 8.

The Embodiment Of FIGS. 8 and 9

The construction thus far described is identical in all respects to that described and claimed in my aforesaid co-pending application Ser. No. 738,508. Practical operation of this equipment has revealed that a small number of defective containers are produced as a result of either misaligned engagement of the internally threaded portion 98 of the injection blocks 92 and 93 with the threaded neck portion of the parison P or, because a major portion of the stripping force is applied to the enlarged parison flange PF, the remainder of the neck portion of the parison is placed under tension during the stripping operation. Heated plastic has very little resistance to tensile forces, hence resulting in cracking of the finish portion of the parison. It is a matter of some difficulty to achieve an accurate alignment of the internal threads in the ejection blocks 92 and 93 with the parison threads PT because the ejection blocks must not only be very accurately machined to be identical to the threads in the neck portion of the injection mold, but more importantly, must be positioned on the ejection mechanism both axially and angularly so as to exactly engage with the threads PT on the neck portion of the parison P.

Referring now to FIGS. 8 and 9, there is shown a modification of this invention which overcomes this problem. In the injection molding assemblage (FIG. 8) a shoulder 161 is provided on the parison core 160 at a position so as to define only a portion of the end face of the resulting molded plastic parison P. Co-operating with the core pin shoulder 160 is an inwardly projecting radial shoulder 140 formed in the neck portions of the cooperating mold halves 35 and 36. Thus, when the mold halves 35 and 36 are disengaged from the parison P formed on the core 160, in the same manner as heretofore described, a radially outer annular portion of the parison end face PE will project above the shoulder 161 of the core pin 160.

Referring now to FIG. 9, this radially projecting outer portion of the parison end face PE is abuttingly engaged by an internally projecting radial shoulder 195 respectively defined by the ejection blocks 192 and 193. The remainder of the internal surfaces of ejection blocks 192 and 193 need not engage the threaded portions of the parison but may, if desired, abut the enlarged flange PF that is commonly formed at the bottom of the neck portion of the parison.

With this configuration, the application of the stripping movement to the ejection mechanism 80 applies a compressive force to the radially outer annular portion of the parison end face PE and eliminates the possibility of tearing the neck portion of the parison through the application of tensile forces thereto. Furthermore, since no intimate engagement of the ejection blocks 192 and 193 with the threaded portion of the plastic parison is produced, the possibility of damaging the threads PT on the parison P during the stripping operation is effectively eliminated.

It will be apparent to those skilled in the art that the foregoing disclosure is exemplary in nature rather than limiting, the invention being limited only by the appended claims.

Accordingly, having clearly and completely defined my invention:

What I claim is:

1. An apparatus for forming an essentially tubular plastic parison for subsequent blowing into a container shape, comprising:
   a turret rotationally mounted on a vertical axis and having a core pin radially extending therefrom;
   a plurality of separate stations located around an arcuate path surrounding said turret, including an injection molding station and a parison ejection station;
   means for intermittently rotating said turret to sequentially position said core pin at each said station;
   a pair of horizontally positioned mold sections at the injection molding station, the mold sections being relatively movable in the vertical direction and selectively closeable around the core pin to form an essentially tubular injection molding cavity, the end of said molding cavity adjacent said turret defining the finished neck portions of the desired container shape, including an annular end surface;

the outer radial portion of said annular parison end surface being defined by an internal shoulder of said molding cavity when said mold sections are closed and being exposed when said mold stations are opened;

a horizontally movable carriage at the ejection station including a gripping mechanism defined by at least two arcuate sections which are radially displaceable to selectively engage and disengage at least a peripheral portion of the exposed neck portion of the molded parison carried by each said core pin, said arcuate sections defining when closed, an annular surface abuttable with said radially outer annular portion of the parison end surface;

said carriage being reciprocable between (a) a first principal position where said gripping mechanism annular surface is aligned with said radial outer portion of the parison end face and (b) a second principal position where the gripping mechanism is axially displaced relative to the core pin to strip said parison from the core pin primarily by the application of a compressive force to said outer annular portion of the parison end face;

displacement means on the carriage for selectively closing the gripping mechanism around the parison at said first principal position and for selectively opening the gripping mechanism at said second principal position to disengage the parison held therebetween;

and transport means for moving the carriage between said first and second principal positions.

2. An apparatus for forming an essentially tubular plastic parison for subsequent blowing into a container shape, comprising:
a turret rotationally mounted on a vertical axis and having a core pin radially extending therefrom;
a plurality of separate stations located around an arcuate path surrounding said turret, including an injection molding station and a parison ejection station;
means for intermittently rotating said turret to sequentially position said core pin at each said station;
a pair of horizontally positioned mold sections at the injection molding station, the mold sections being relatively movable in the vertical direction and selectively closeable around the core pin to form an essentially tubular injection molding cavity, the end of said molding cavity adjacent said turret defining the finished neck portions of the desired container shape, including an annular end surface;
an inner radial portion of said parison annular end surface being defined by an external shoulder on said core pin, and the outer radial portion of said annular parison end surface being defined by an internal shoulder of said molding cavity when said mold sections are closed and being exposed when said mold sections are opened;
a horizontally movable carriage at the ejection station including a gripping mechanism defined by at least two arcuate sections which are radially displaceable to selectively engage and disengage at least a peripheral portion of the neck portion of the molded parison carried by each said core pin, said arcuate sections defining when closed, an annular surface abuttable with said radially outer annular portion of the exposed parison end surface;

said carriage being reciprocable between (a) a first principal position where said gripping mechanism annular surface is aligned with said radial outer portion of the parison end face and (b) a second principal position where the gripping mechanism is axially displaced relative to the core pin to strip said parison from the core pin primarily by the application of a compressive force to said outer annular portion of the parison end face;

displacement means on the carriage for selectively closing the gripping mechanism around the parison at said frist principal position and for selectively opening the gripping mechanism at said second principal position to disengage the parison held therebetween;

and transport means for moving the carriage between said first and second principal positions.

3. An apparatus for forming a plurality of essentially tubular plastic parisons for subsequent blowing into a container shape, comprising:
a turret rotationally mounted on a vertical axis and having a plurality of horizontal sets of parallel core pins extending therefrom in a generally radial direction;
a plurality of separate stations located around an arcuate path around and adjacent to the turret, including an injection molding station and a parison ejection station;
means for intermittently rotating said turret to sequentially position each said set of core pins at each said station;
a pair of horizontally positioned mold sections at the injection molding station, the mold sections being relatively movable in a vertical direction and selectively closeable around a set of core pins to cooperate therewith to form essentially tubular injection molding cavities;
the ends of said molding cavities adjacent said turret defining the finished neck portions of the desired container shape, and including an annular end surface;
an outer radial portion of each said annular parison end surface being defined by an internal shoulder of said respective molding cavity when said mold sections are closed and being exposed when said mold sections are opened;
a horizontally movable carriage at the ejection station including a plurality of essentially annular gripping surfaces totaling in number to the number of core pins in each of said core pin sets, each of said gripping surfaces being defined by respective arcuate sections which are radially displaceable to selectively engage and disengage external peripheral portions of the respective mold parisons, each said arcuate section including an annular surface abuttable with said radially outer annular portion of the exposed parison end face;

said carriage being reciprocable between (a) a first principal position where the gripping surfaces are abutting with at least said radial outer portions of the parison end faces positioned at the ejection station, and (b) a second principal position where the gripping surfaces are axially displaced relative to the core pins to strip said parisons from the core pins primarily by the application of compressive forces to each parison;

displacement means on the carriage for selectively closing the arcuate gripping surface sections around said parisons at said first principal position and for selectively opening the arcuate gripping surfaces at said second principal position to release the parisons held therebetween; and transport means for moving said carriage between said first and second principal positions.

4. An apparatus for forming a plurality of essentially tubular plastic parisons for subsequent blowing into a container shape, comprising:

a turret rotationally mounted on a vertical axis and having a plurality of horizontal sets of parallel core pins extending therefrom in a generally radial direction;

a plurality of separate stations located around an arcuate path around and adjacent to the turret, including an injection molding station and a parison ejection station;

means for intermittently rotating said turret to sequentially position each said set of core pins at each said station;

a pair of horizontally positioned mold sections at the injection molding station, the mold sections being relatively moveable in a vertical direction and selectively closeable around a set of core pins to cooperate therewith to form essentially tubular injection molding cavities;

the ends of said molding cavities adjacent said turret defining the finished neck portions of the desired container shape, and including an annular end surface;

an inner radial portion of said annular end surface of said parison annular end surface being defined by an external shoulder on said core pin, and an outer radial portion of each said annular parison end surface being defined by an internal shoulder of said respective molding cavity when said mold sections are closed and being exposed when said mold sections are opened;

a horizontally movable carriage at the ejection station including a plurality of essentially annular gripping surfaces totaling in number to the number of core pins in each of said core pin sets, each of said gripping surfaces being defined by respective arcuate sections which are radially displaceable to selectively engage and disengage external peripheral portions of the respective mold parisons, each of said arcuate section including an annular surface abuttable with said radially outer annular portion of the exposed parison end face;

said carriage being reciprocable between (a) a first principal position where the gripping surfaces are abutting with at least said radial outer portions of the parison end faces positioned at the ejection station, and (b) a second principal position where the gripping surfaces are axially displaced relative to the core pins to strip said parisons from the core pins primarily by the application of compressive forces to each parison;

displacement means on the carriage for selectively closing the arcuate gripping surface sections around said parisons at said first principal position and for selectively opening the arcuate gripping surfaces at said second principal position to release the parisons held therebetween; and transport means for moving said carriage between said first and second principal positions.

5. An apparatus for forming a plurality of essentially tubular plastic parisons, comprising:

a vertically movable turret rotationally mounted on a vertical axis and having a plurality of horizontal sets of core pins radially extending therefrom;

means for intermittently rotating said turret to sequentially position said core pin at each said station;

a plurality of separate stations located around an arcuate path adjacent the turret, including an injection molding station and a parison ejection station;

a pair of horizontally positioned mold sections at the injection molding station, the mold sections being relatively movable in the vertical direction and selectively closable around the sets of core pins to form essentially tubular injection molding cavities;

a horizontally movable carriage at the ejection station including a plurality of essentially annular gripping surfaces totaling in number to the number of core pins in each of said core pin sets, each of the gripping surfaces being defined by respective semiarcuate sections which are radially displaceable to selectively engage and disengage only an outer peripheral section on respective molded parisons, located adjacent to the open end of the parison, the carriage being reciprocable between (a) a first principal position where the gripping surfaces are radially aligned with at least a portion of respective core pins positioned at the ejection station and (b) a second principal position where the gripping surfaces are horizontally displaced from the core pins at the ejection station;

displacement means on the carriage for selectively closing the arcuate gripping surface sections around parisons at said first principal position and for selectively opening the arcuate gripping surfaces at said second principal position, to disengage the parisons held therebetween; and transport means for moving the carriage between said first and second principal positions.

6. The apparatus as defined in claim 5, characterized by said displacement means being operable to open the gripping surface after the carriage has remained at said second principal location for a dwell period, during which time the parisons are held in a horizontal cantilevered position for cooling.

7. The apparatus as defined in claim 5, further including a cooling station adjacent the arcuate path circumscribed by he rotational movement of the turret between the injection molding station and the ejection station, said cooling station including a stationary lower air plenum surrounding a lower portion of the parisons as the turret is lowered into position for cooling, and an upper, vertically movable air plenum which surrounds an upper portion of the parisons, both plenums including air delivery ports for directing streams of cooling air onto exterior surface portions of the parisons.

* * * * *